United States Patent
Perich et al.

(10) Patent No.: US 10,691,139 B1
(45) Date of Patent: Jun. 23, 2020

(54) SYSTEMS AND METHODS FOR ALTITUDE CAPTURE PERFORMANCE MONITOR

(71) Applicant: Rockwell Collins, Inc., Cedar Rapids, IA (US)

(72) Inventors: John P. Perich, Marion, IA (US); Cornelis Van Der Linden, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 75 days.

(21) Appl. No.: 16/130,524

(22) Filed: Sep. 13, 2018

(51) Int. Cl.
*B64D 43/02* (2006.01)
*G05D 1/04* (2006.01)
*B64C 13/18* (2006.01)
*B64C 13/04* (2006.01)
*G05D 1/06* (2006.01)

(52) U.S. Cl.
CPC ............ *G05D 1/042* (2013.01); *B64D 43/02* (2013.01); *G05D 1/04* (2013.01); *B64C 13/04* (2013.01); *B64C 13/18* (2013.01); *G05D 1/0607* (2013.01)

(58) Field of Classification Search
CPC ........ G05D 1/042; G05D 1/04; G05D 1/0607; B64D 43/02; B64C 13/18; B64C 13/04
USPC ............... 701/7, 4, 14; 244/180, 76 A, 75.1; 340/970, 921, 977
See application file for complete search history.

(56) References Cited

U.S. PATENT DOCUMENTS 8,880,245 B2 * 11/2014 Leberquer .............. G05D 1/042
 701/3
8,989,924 B2 * 3/2015 Seydoux ................. A63H 27/12
 244/17.13
9,360,866 B2 * 6/2016 Gutierrez-Castaneda ...................
 B64C 13/18
2012/0022723 A1 * 1/2012 Botargues ............... G05D 1/042
 701/4
2014/0039731 A1 * 2/2014 Leberquer ............... B64C 19/00
 701/3
2015/0120100 A1 * 4/2015 Sacle ...................... G01C 21/20
 701/18

(Continued)

FOREIGN PATENT DOCUMENTS

CA          2745515 A1 *  1/2012  .......... G05D 1/0607
CN       102375454 B  *  4/2016  .......... G05D 1/0055

(Continued)

*Primary Examiner* — Cuong H Nguyen
(74) *Attorney, Agent, or Firm* — Donna P. Suchy (57) ABSTRACT

A flight controller includes an altitude capture controller, an altitude profile predictor, and an alert generator. The altitude capture controller receives a first current altitude, a target altitude, and at least one energy state parameter; generates a flight control command, a first expected altitude, and a first predicted altitude. The altitude profile predictor generates a second predicted altitude. The alert generator calculates an expected altitude deviation by comparing a second current altitude of the platform to the first expected altitude; calculates a predicted altitude deviation by comparing the first predicted altitude to the second predicted altitude; and outputs an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

20 Claims, 4 Drawing Sheets

(56) References Cited

U.S. PATENT DOCUMENTS

| | | | | |
|---|---|---|---|---|
| 2015/0197335 A1* | 7/2015 | Dekel | ................ | B64C 29/0033 |
| | | | | 701/5 |
| 2015/0307207 A1* | 10/2015 | Meunier | ................ | G08G 5/02 |
| | | | | 701/4 |
| 2016/0004255 A1* | 1/2016 | Moxon | ................ | G05D 1/0055 |
| | | | | 701/7 |
| 2016/0026188 A1* | 1/2016 | Lanterna | ............ | G05D 1/0607 |
| | | | | 701/5 |
| 2016/0062364 A1* | 3/2016 | Foinet | .................... | A63H 27/14 |
| | | | | 701/2 |
| 2016/0068267 A1* | 3/2016 | Liu | ........................ | G05D 1/042 |
| | | | | 701/11 |
| 2016/0085239 A1* | 3/2016 | Boyer | ................ | G08G 5/0021 |
| | | | | 701/5 |

FOREIGN PATENT DOCUMENTS

| | | | | | |
|---|---|---|---|---|---|
| FR | | 2963118 A1 * | 1/2012 | ............ | G05D 1/042 |
| FR | | 3023014 A1 * | 1/2016 | ............ | B64C 13/22 |
| FR | | 3023014 B1 * | 6/2016 | ............ | B64C 13/18 |
| GB | | 2472497 B  * | 11/2011 | ............. | B64D 45/04 |

* cited by examiner

SYSTEMS AND METHODS FOR ALTITUDE CAPTURE PERFORMANCE MONITOR

BACKGROUND

The present disclosure relates generally to aircraft control systems. More particularly, the present disclosure relates to systems and methods for an altitude capture performance monitor.

Altitude capture maneuvers can be used to maneuver an airborne platform to a target altitude. For example, during an altitude capture maneuver, autoflight and/or autothrust systems can execute a pitch control loop to generate commands to capture the target altitude, which may be selected based on input received from an operator of the airborne platform, such as a pilot. However, in existing systems, the altitude capture maneuver may be attempted even if the airborne platform does not have sufficient energy to achieve the target altitude prior to or during the maneuver.

SUMMARY

In one aspect, the inventive concepts disclosed herein are directed to a flight controller. The flight controller includes an altitude capture controller, an altitude profile predictor, and an alert generator. The altitude capture controller is configured to receive a first current altitude of a platform, a target altitude, and at least one energy state parameter regarding the platform; generate a flight control command expected to cause the platform to move to the target altitude based on the current altitude and the at least one energy state parameter; generate a first expected altitude of the platform for a first point in time based on the flight control command; and generate a first predicted altitude of the platform for a second point in time subsequent to the first point in time based on the flight control command. The altitude profile predictor is configured to generate a second predicted altitude of the platform for the second point in time based on the current altitude, the at least one energy state parameter, and an energy model representative of movement of the platform. The alert generator is configured to calculate an expected altitude deviation by comparing a second current altitude of the platform for the first point in time to the first expected altitude; calculate a predicted altitude deviation by comparing the first predicted altitude to the second predicted altitude; and output an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

In a further aspect, the inventive concepts disclosed herein are directed to an airborne platform. The airborne platform includes an autopilot that controls a flight control surface, a flight controller, and a user interface. The flight controller includes an altitude capture controller, an altitude profile predictor, and an alert generator. The altitude capture controller receives a first current altitude, a target altitude, and at least one energy state parameter; generates a flight control command to move to the target altitude based on the current altitude and the at least one energy state parameter; transmits the flight control command to the autopilot to cause the autopilot to control the flight control surface based on the flight control command; generates a first expected profile parameter for a first point in time based on the flight control command; and generate a first predicted profile parameter for a second point in time subsequent to the first point in time based on the flight control command. The altitude profile predictor is configured to generate a second predicted profile parameter of the platform for the second point in time based on the current altitude, the at least one energy state parameter, and an energy model representative of movement of the platform. The alert generator is configured to calculate an expected deviation by comparing a current profile parameter of the platform for the first point in time to the first expected profile parameter, calculate a predicted deviation by comparing the first predicted profile parameter to the second predicted profile parameter, and output an alert responsive to at least one of (i) an expected deviation threshold function indicating the expected deviation exceeds an expected deviation threshold or (ii) a predicted deviation function indicating the predicted deviation exceeds a predicted deviation threshold. The user interface is configured to output an indication of the alert.

In a further aspect, the inventive concepts disclosed herein are directed to a method of operating an altitude capture performance monitor. The method includes receiving, at an altitude capture controller, a first current altitude of a platform, a target altitude, and at least one energy state parameter regarding the platform; generating, by the altitude capture controller, a flight control command expected to cause the platform to move to the target altitude based on the current altitude and the at least one energy state parameter; generating, by the altitude capture controller, a first expected altitude of the platform for a first point in time based on the flight control command; generating, by the altitude capture controller, a first predicted altitude of the platform for a second point in time subsequent to the first point in time based on the flight control command; generating, by an altitude profile predictor, a second predicted altitude of the platform for the second point in time based on the current altitude, the at least one energy state parameter, and an energy model representative of movement of the platform; calculating, by an alert generator, an expected altitude deviation by comparing a second current altitude of the platform for the first point in time to the first expected altitude; calculating, by the alert generator, a predicted altitude deviation by comparing the first predicted altitude to the second predicted altitude; and outputting, by the alert generator, an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for altitude capture performance monitors. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment in which a platform may be expected to perform an autonomous maneuver, the effectiveness of which may depend on an energy state of the platform (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a flight controller includes an altitude capture controller, an altitude profile predictor, and an alert generator. The altitude capture controller is configured to receive a first current altitude of a platform, a target altitude, and at least one energy state parameter regarding the platform; generate a flight control command expected to cause the platform to move to the target altitude based on the current altitude and the at least one energy state parameter; generate a first expected altitude of the platform for a first point in time based on the flight control command; and generate a first predicted altitude of the platform for a second point in time subsequent to the first point in time based on the flight control command. The altitude profile predictor is configured to generate a second predicted altitude of the platform for the second point in time based on the current altitude, the at least one energy state parameter, and an energy model representative of movement of the platform. The alert generator is configured to calculate an expected altitude deviation by comparing a second current altitude of the platform for the first point in time to the first expected altitude; calculate a predicted altitude deviation by comparing the first predicted altitude to the second predicted altitude; and output an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

Traditional altitude capture systems may have undesirable performance in various situations. In some situations, an energy state of the platform is not compatible with the vertical speed profile that an altitude capture control law expects the platform to be able to perform. For example, if an autothrust system is not engaged, and a thrust controller of the platform is not adjusted by a pilot as the altitude is reached (e.g., as the platform climbs), the platform may experience a large deviation from the current airspeed being flown. These situations can be further exacerbated if the autoflight system of the platform is at the limits of its authority, and the altitude of the platform is deviated from—this may cause the platform to receive a deviation from air traffic control, or put the platform within an unsafe distance from other platforms. In some situations, an autothrust may be engaged and an engine out may occur subsequent to activate of the altitude capture mode. If the climb prior to the altitude capture was performed at a high level of performance, including maximum performance, it may be unlikely that there is sufficient energy for the platform to maintain the vertical speed required by the altitude capture controller (e.g., the altitude capture controller may issue commands requiring continued climbing that the energy state of the platform cannot achieve, especially with the engine out). These situations can lead to large speed deviations below the selected target airspeed (e.g., airspeed reference). The present solution can address these situations by monitoring and predicting deviations that may result due to inconsistencies between the behavior that a traditional altitude capture controller will use to control the altitude capture maneuver and the actual behavior that the platform will perform, given factors such as the energy state of the platform. The present solution can analyze, in real time, the current profile of the platform as compared to expected and predicted profiles, and use that information to generate alerts before the platform may have insufficient energy to complete the altitude capture maneuver or otherwise enter a state where the platform is susceptible to situations described above. The present solution can also mitigate an excess of energy during the altitude capture maneuver that would otherwise cause the platform to overshoot the target altitude. The alert can be used to trigger an automatic mode change, such as a deactivation of the altitude capture controller or a change to a different, safer maneuver.

The flight controller can be integrated with an airborne platform or other platform as described herein. For example, the flight controller and associated systems described herein can be associated with an aircraft cockpit display of the airborne platform.

Figure 1A:
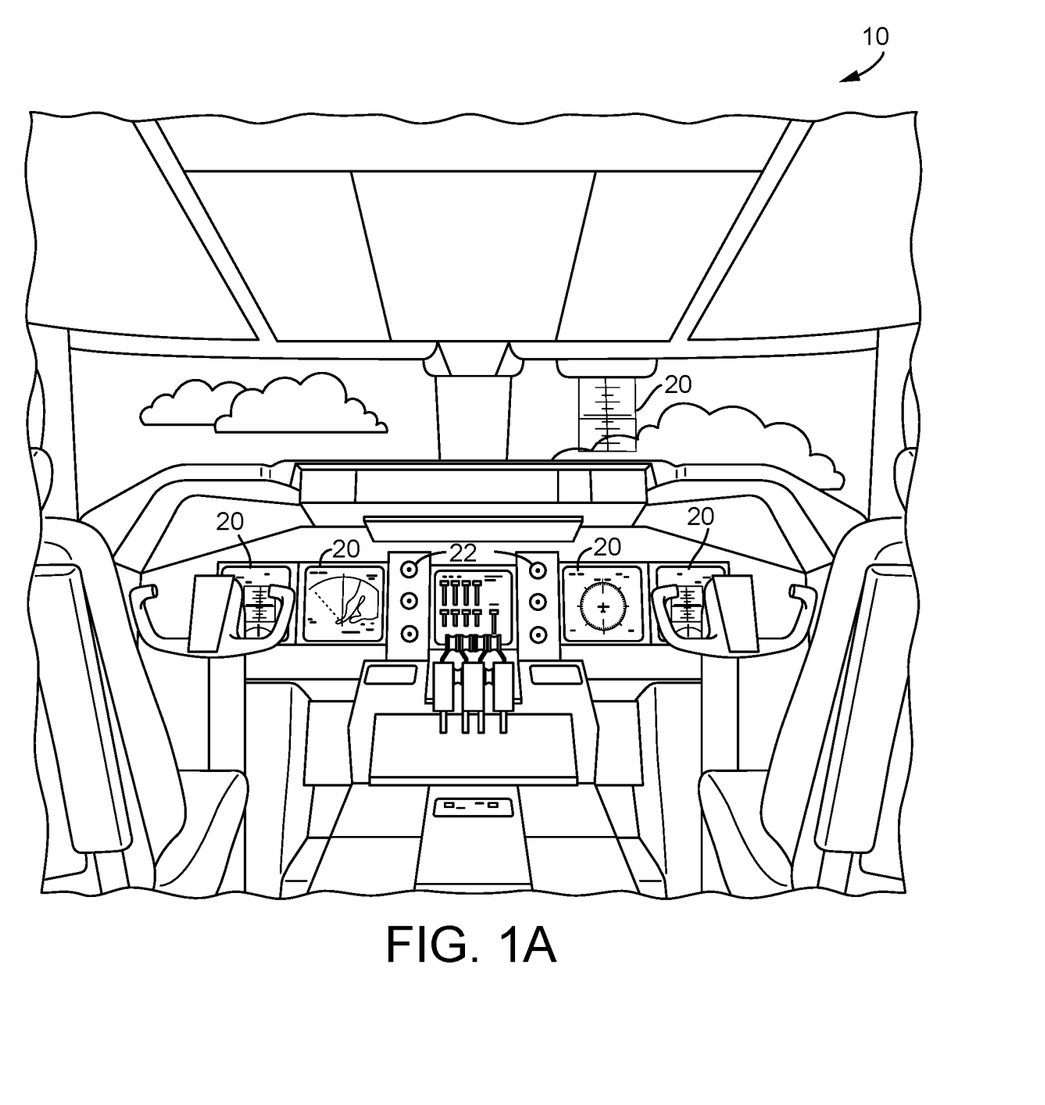
FIG. 1A is a schematic diagram of an exemplary embodiment of an aircraft control center according to the inventive concepts disclosed herein.

Referring to FIG. 1A, a perspective view schematic illustration of an aircraft flight deck or cockpit 10 is shown accordingly to an exemplary embodiment of the inventive concepts disclosed herein. The aircraft flight deck 10 can be configured for an aircraft operator or other user to interact with avionics systems of an airborne platform. The aircraft flight deck 10 may include one or more flight displays 20 and one or more user interface ("UP") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. UI elements 22, such as indicator lights, displays, display elements, and audio alerting devices, may be configured to warn of potentially threatening conditions such as severe weather, terrain, and obstacles, such as potential collisions with other aircraft, as well as alerts associated with altitude capture maneuvers.

Figure 1B:
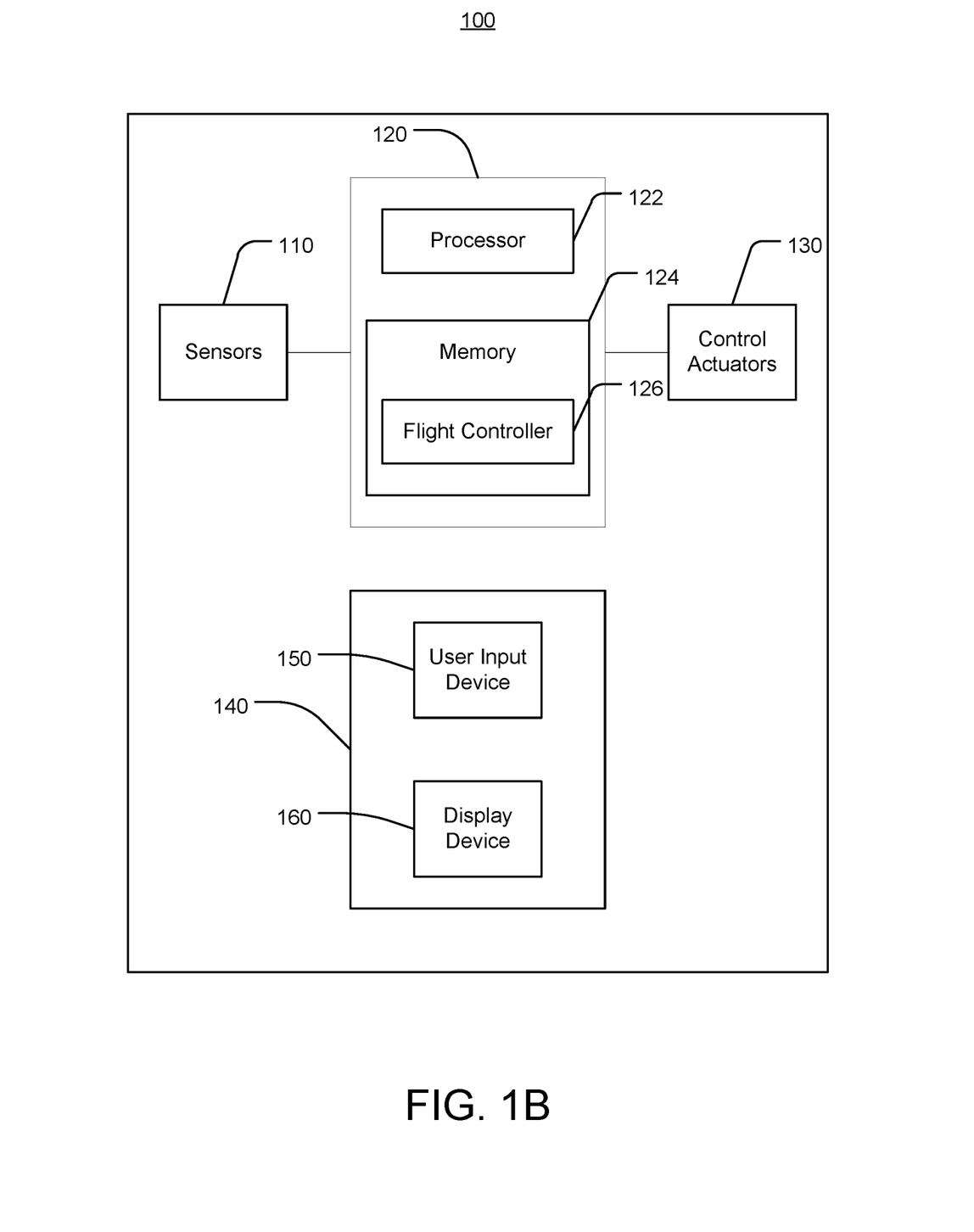
FIG. 1B is a block diagram of an exemplary embodiment of a control system of an airborne platform according to the inventive concepts disclosed herein.

Referring now to FIG. 1B, an exemplary embodiment of a control system 100 according to the inventive concepts disclosed herein includes one or more sensors 110, a control circuit 120, one or more control actuators 130, and a user interface 140. The control system 100 can be implemented on a platform, such as an airborne platform.

The one or more sensors 110 can detect, generate, and output sensor data regarding the platform and an environment about the platform, including altitude and energy state variables, such as speed (e.g., vertical speed) and acceleration (e.g., vertical acceleration). The one or more sensors 110 can include various sensors, including but not limited to an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, a navigation system, a vision system (e.g., a camera, an infrared image sensor, a LIDAR), a global navigation satellite system (GNSS), a weather radar system (e.g., a weather radar configured to output Doppler measurements), an altimeter, a true airspeed sensor, or an indicated airspeed sensor.

The processing circuit 120 includes a processor 122 and memory 124. The processor 122 may be implemented as a specific purpose processor, an application specific integrated circuit (ASIC), one or more field programmable gate arrays (FPGAs), a group of processing components, or other suitable electronic processing components. The memory 124 is one or more devices (e.g., RAM, ROM, flash memory, hard disk storage) for storing data and computer code for completing and facilitating the various user or client processes, layers, and modules described in the present disclosure. The memory 124 may be or include volatile memory or non-volatile memory and may include database components, object code components, script components, or any other type of information structure for supporting the various activities and information structures of the inventive concepts disclosed herein. The memory 124 is communicably connected to the processor 122 and includes computer code or instruction modules for executing one or more processes described herein. The memory 124 includes various circuits, software engines, and/or modules that cause the processor 122 to execute the systems and methods described herein. For example, the memory 124 includes a flight controller 126 that can control operation of control actuators 130.

The flight controller 126 generates commands to control operation of the one or more control actuators 130, including based on user input. The one or more control actuators 130 can control functions of the platform such as thrust, pitch, yaw, and roll. The one or more control actuators 130 can drive engines/turbines of the platform. The one or more control actuators 130 can include flight control surfaces.

The user interface 140 includes a user input device 150 and a display device 160. The user input device 150 can incorporate features of the UI elements 22 described with reference to FIG. 1A, such as to receive inputs for providing to the flight controller 126 and for controlling the one or more control actuators 130. The user interface 140 can include an audio input device, such as a microphone, used to receive audio information, and can process the audio information, such as to identify and transmit commands to the flight controller 126 based on the audio information. The display device 160 can incorporate features of the flight displays 20 described with reference to FIG. 1A. The user interface 140 can include an audio output device.

Figure 2:
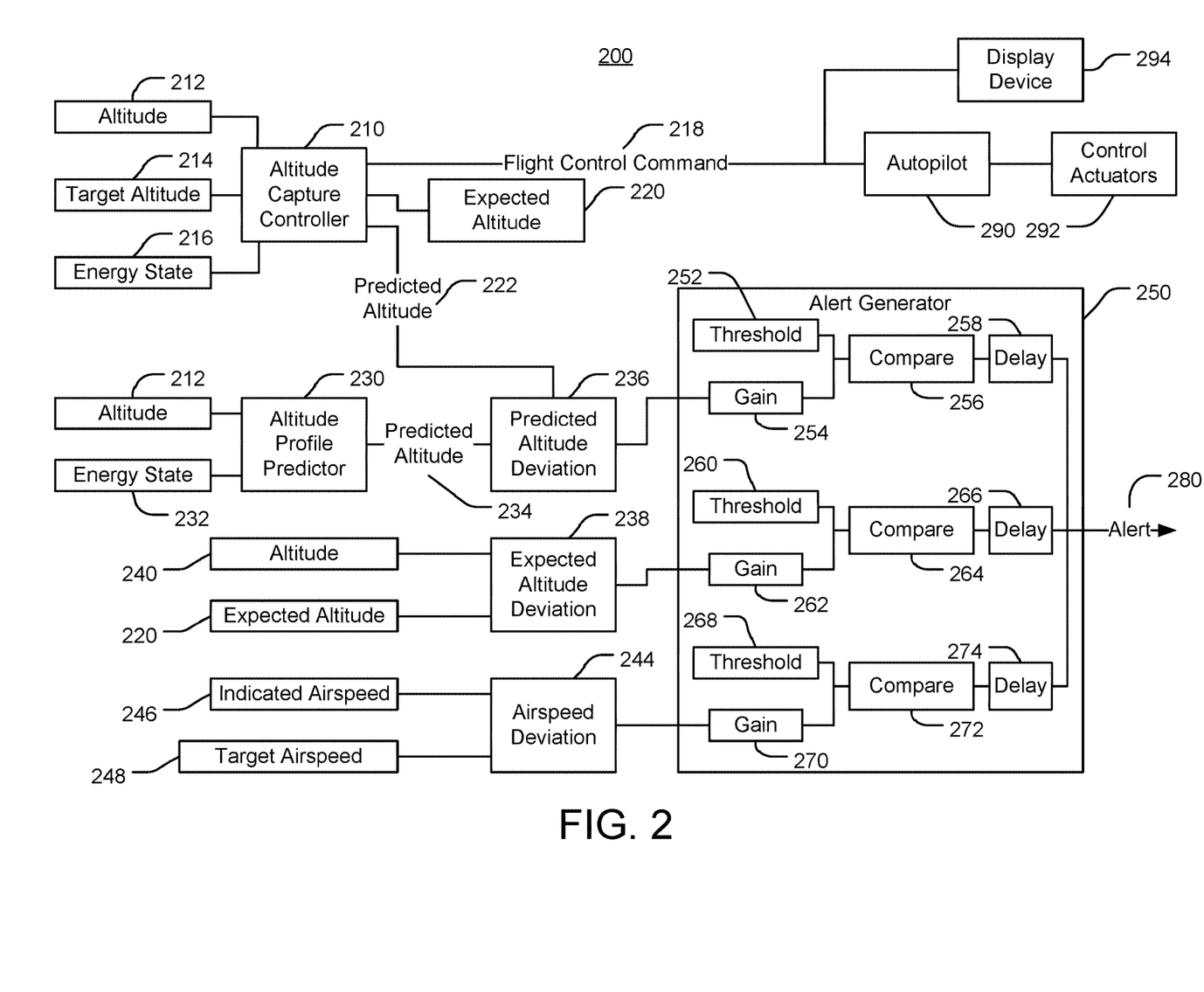
FIG. 2 is a block diagram of an exemplary embodiment of a flight controller of the control system of FIG. 1.

Referring now to FIG. 2, an exemplary embodiment of an altitude capture performance monitor system (ACPMS) 200 according to the inventive concepts disclosed herein includes an altitude capture controller 210, an altitude profile predictor 230, and an alert generator 250. The ACPMS 200 can incorporate features of the flight controller 126 described with reference to FIG. 1B. For example, as described further herein, the ACPMS 200 can be used to provide flight control commands 218 to autopilot 290 to control operation of one or more control actuators 292 (which can incorporate features of the one or more control actuators 130 described with reference to FIG. 1B).

The altitude capture controller 210 generates flight control command(s) 218, such as to cause an airborne platform implementing the ACPMS 200 to perform an altitude capture maneuver. In some embodiments, the flight control commands 218 include pitch commands indicating a pitch to which the airborne platform is to be adjusted.

The altitude capture controller 210 can transmit the flight control commands 218 to an autopilot 290 configured to control operation of the one or more control actuators 292. The autopilot 290 can convert target flight parameters, such as speed or altitude, into instructions configured to cause the one or more control actuators 292 to move the platform in a manner expected to achieve the target flight parameters. The autopilot 290 can include an autothrottle. The altitude capture controller 210 can also transmit the flight control commands 218 to a display device 294 in order to present the flight control commands 218 and other related flight control information. The display device 294 can incorporate features of the display device 160 described with reference to FIG. 1A.

The altitude capture controller 210 generates the flight control commands 218 based on a current altitude 212, a target altitude 214, and an energy state 216. The target altitude 214 may be received as a user input (e.g., received from user interface 140 described with reference to FIG. 1B). The current altitude 212 may be received from an altitude sensor, such as an altimeter (e.g., sensor 110 described with reference to FIG. 1B). The energy state 216 may include a velocity, such as a vertical speed of the platform. The energy state 216 may include a true airspeed of the platform. The altitude capture controller 210 can generate the flight control command 218 to indicate a target pitch expected to cause the airborne platform to achieve the target altitude 214, given the current altitude 212 and velocity of energy state 216. The altitude capture controller 210 can generate a plurality of flight control commands 218 at several points in time, indicating pitch actions to perform to achieve the target altitude (e.g., nose up, nose down over time to level the platform at the target altitude). In some embodiments, the altitude capture controller 210 executes a proportional-integral-derivative (PID) controller, such as by using an error between a target altitude and current altitude of the platform as the proportional variable, and the vertical speed and acceleration of the platform as the derivative variables.

The altitude capture controller 210 generates an expected altitude 220 of the platform based on at least one of the current altitude 212, the target altitude 214, the energy state 216, or the flight control command 218. It will be appreciated that calculating the expected altitude 220 based on the flight control command 218 can include calculating the expected altitude 220 based on the input variables used to generate the flight control command 218 and/or in parallel to generation of the flight control command 218. The altitude capture controller 210 can calculate the expected altitude 220 for a first point in time, such as a first point in time in the future relative to a time at which the current altitude 212 is measured (and relative to a time at which the calculation of the expected altitude 220 occurs). In some embodiments, the expected altitude 220 indicates an altitude that the platform is expected to reach at the first point in time upon executing the flight control command 218. The altitude capture controller 210 can generate the expected altitude 220 as a representation of an altitude the platform is expected to achieve upon executing the maneuvers caused by the plurality of flight control commands 218, such as by evaluating an altitude capture function (e.g., a function executed by the PID controller; an exponential decay of altitude function) based on the current altitude 212, target altitude 214, and energy state 216 when the altitude capture controller 210 is activated.

The altitude capture controller 210 generates a predicted altitude 222 of the platform based on at least one of the current altitude 212, the target altitude 214, the energy state 216, or the flight control command 218. It will be appreciated that calculating the predicted altitude 222 based on the flight control command 218 can include calculating the predicted altitude 222 based on the input variables used to generate the flight control command 218 and/or in parallel to generation of the flight control command. The altitude capture controller 210 can calculate the predicted altitude 222 for a second point in time subsequent to the first point in time. In some embodiments, the predicted altitude 222 indicates an altitude that the platform is expected to reach at the second point in time upon continuing to execute flight control commands 218 that are generated by the altitude capture controller 210 in order to achieve the target altitude 214. In some embodiments, the altitude capture controller 210 generates the flight control commands 218, using the energy state 216 known at the time of activation of the altitude capture controller 210, in a manner such that the altitude that the platform is expected to achieve can be represented by a function of time, f(t) (e.g., f(t, energy state$_{t0}$). As such, the expected altitude 220 and predicted altitude 222 generated by the altitude capture controller 210 can be represented by an evaluation of f(t) at the first point in time and the second point in time, respectively. For example, if the altitude capture controller 210 generates the flight control commands 218 at an initial point in time $t_0$ using the energy state 216 at the $t_0$, then at any point after $t_0$, the expected altitude 220 can be represented as f($t_{current}$), and the predicted altitude 222 can be represented as f($t_{current}$+Δt), where Δt is the difference between the second point in time and first point in time. The expected altitude 220 can thus represent an ideal altitude state for the platform to achieve at a given point in time (e.g., the first point in time) based on the energy state 216 known at the initial point in time $t_0$, and the predicted altitude 222 can represent an ideal altitude state for the platform to achieve at a future point in time (e.g., the second point in time) based on the energy state 216 known at the initial point in time $t_0$.

The altitude profile predictor 230 generates a predicted altitude 234 based on the current altitude 212 and an energy state 232. The energy state 232 can include an acceleration of the platform (and may also include a velocity of the platform, as is included in the energy state 216). By using the energy state 232, including the acceleration of the energy state 232, to calculate the predicted altitude 234 (e.g., during the course of the altitude capture maneuver), the altitude profile predictor 230 can calculate the predicted altitude 234 to more accurately determine an altitude that the platform is capable of achieving or will achieve given the current altitude 212. For example, the altitude profile predictor 230 can execute an energy model using the acceleration energy state 232 to determine relationships between factors such as the kinetic energy of the platform, the thrust generated by the platform (e.g., given the flight control commands) and associated lift of the platform, gravity, and drag, in order to determine the predicted altitude 234. The altitude profile predictor 230 can determine the predicted altitude 234 for the second point in time for which the predicted altitude 222 is determined by the altitude capture controller 210. The altitude profile predictor 230 can determine the predicted altitude 234 during the course of the altitude capture maneuver (e.g., subsequent to a first flight control command 218 being executed using updated energy state 232 information as compared to what was used by the altitude capture controller 210 to generate the predicted altitude 222), which can enable a more accurate representation of the altitude 234 that the platform is predicted to achieve at the second point in time. As compared to the altitude capture controller 210, the altitude profile predictor 230 can use the current energy state 232 each time the predicted altitude 234 is calculated. The predicted altitude 234 can thus represent a prediction of the altitude state the platform will achieve in the future (e.g., the second point in time), taking into account any changes in energy state that may occur as the altitude capture maneuver is performed. As discussed below, the ACPMS 200 can thus compare current altitude 240 to expected altitude 220 and predicted altitude 222 to predicted altitude 234 to identify discrepancies between the actual behavior of the platform while the altitude capture maneuver is being performed and the ideal behavior corresponding to the flight control commands 218.

The ACPMS 200 determines a predicted altitude deviation 236 based on the predicted altitude 222 and the predicted altitude 234. For example, the ACPMS 200 can determine the predicted altitude deviation 236 by comparing the predicted altitude 222 and the predicted altitude 234, such as by subtracting one of the predicted altitude 222 or predicted altitude 234 from the other of the predicted altitude 222 or predicted altitude 234. The predicted altitude deviation 236 may represent a difference between the altitude that a control law of the altitude capture controller 210 would predict the platform to achieve by executing the plurality of flight control commands 218 up to the second point in time, and the altitude that would be achieved given the evolution of the energy state 232 of the platform over time (e.g., taking into account more recent information regarding the energy state 232 of the platform once the plurality of flight control commands 218 have been executed).

In some embodiments, the ACPMS 200 determines an expected altitude deviation 238 based on a current altitude 240 and the expected altitude 220 generated by the altitude capture controller 210. The ACPMS 200 can receive the current altitude 240 to correspond to the first point in time (e.g., by sampling an altimeter at the first point in time, such as an altimeter of sensors 110 described with reference to FIG. 1B), so that the time of the current altitude 240 matches the time of the expected altitude 220. The ACPMS 200 can compare the expected altitude 220 to the current altitude 240 to determine the expected altitude deviation 238, such as by subtracting one of the expected altitude 220 or the current altitude 240 from the other of the expected altitude 220 or the current altitude 240.

In some embodiments, the ACPMS 200 determines an expected airspeed deviation 244 based on an indicated airspeed 246 and a target airspeed 248. The ACPMS 200 can receive the indicated airspeed 246 from a corresponding sensor (e.g., sensors 110 as described with reference to FIG. 1B). The target airspeed 248 can be an airspeed reference. The target airspeed 248 can be received as a user input and/or from a flight management system. The target airspeed 248 can be indicative of one or more airspeed thresholds for operation of the platform. The ACPMS 200 can compare the indicated airspeed 246 to the target airspeed 248 to determine the airspeed deviation 244, such as by subtracting one of the indicated airspeed 246 or target airspeed 248 from the other of the indicated airspeed 246 or target airspeed 248.

The alert generator 250 can generate an alert 280 indicative of whether the platform can be expected to be able to achieve the target altitude 214. For example, the alert generator 250 can generate the alert 280 based on evaluating at least one of the predicted altitude deviation 236, the expected altitude deviation 238, or the airspeed deviation 244.

As shown in FIG. 2, the alert generator 250 can compare 256 the predicted altitude deviation 236 to a threshold 252.

The threshold 252 may be set to a level indicative of the platform failing to perform the altitude capture maneuver if the energy state 232 of the platform is insufficient, particularly if the altitude at which the platform is predicted to be in the future as calculated by the altitude capture controller 210 (predicted altitude 222) is significantly different than the altitude at which the platform is predicted to be in the future as calculated by the altitude profile predictor 230 (predicted altitude 234). The threshold 252 may be determined based on simulation and/or testing of the platform with various altitude capture maneuver attempts, energy states, and altitudes. In some embodiments, the alert generator 250 applies a gain 254 to the predicted altitude deviation 236 in order to compare 256 the predicted altitude deviation 236 to the threshold 252. Responsive to the comparison 256 indicating that the predicted altitude deviation 236 exceeds the threshold 252 (including if the comparison 256 is performed after having applied the gain 254 to the predicted altitude deviation 236), the alert generator 250 can generate an alert 280.

The alert generator 250 can compare 264 the expected altitude deviation 238 to a threshold 260, in a similar manner as the comparison 256. The threshold 260 may be set to a level indicative of the platform failing to perform the altitude capture maneuver if the energy state 232 of the platform is insufficient, particularly if the actual altitude 240 of the platform is significantly different than the expected altitude 220 that was calculated by the altitude capture controller 210. The threshold 260 may be determined based on simulation and/or testing of the platform with various altitude capture maneuver attempts, energy states, and altitudes. In some embodiments, the alert generator 250 applies a gain 262 to the expected altitude deviation 238 in order to compare 264 the expected altitude deviation 238 to the threshold 260. Responsive to the comparison 264 indicating that the expected altitude deviation 238 exceeds the threshold 260 (including if the comparison 264 is performed after having applied the gain 262 to the expected altitude deviation 238), the alert generator 250 can generate the alert 280.

The alert generator 250 can compare 272 the airspeed deviation 244 to a threshold 268, in a similar manner as the comparison 256. The threshold 268 may be set to a level indicative of the platform failing to perform the altitude capture maneuver if the energy state 232 of the platform is insufficient, particularly if the indicated airspeed 246 and target airspeed 248 are significantly different such that the output of the altitude capture controller 210 may be less likely to be trustworthy. The threshold 268 may be determined based on simulation and/or testing of the platform with various altitude capture maneuver attempts, energy states, and altitudes. In some embodiments, the alert generator 250 applies a gain 270 to the airspeed deviation 244 in order to compare 272 the airspeed deviation 244 to the threshold 268. Responsive to the comparison 272 indicating that the airspeed deviation 244 exceeds the threshold 268 (including if the comparison 272 is performed after having applied the gain 270 to the airspeed deviation 244), the alert generator 250 can generate the alert 280.

In some embodiments, the alert generator 250 applies one or more delays 258, 266, 274 to the outputs of the respective comparisons 256, 264, 272 in order to generate the alert 280. The delays 258, 266, 274 can be used to more accurately align the alert 280 generation to the physical action of the platform. In some embodiments, the alert generator 250 uses the delays 258, 266, 274 to reduce the effect of transient instances in which the predicted altitude deviation 236 exceeds the threshold 252, the expected altitude deviation 238 exceeds the threshold 260, and/or the airspeed deviation 244 exceeds the threshold 268. In some embodiments, the threshold 260 is greater than the threshold 252 and/or the gain 262 is greater than the gain 254, which can enable the alert generator 250 to be less sensitive to transient and/or noise-based effects resulting in increases in the value of the expected altitude deviation 238, while still responding effectively to the potential for behavior that should be alerted using the (further in the future) predicted altitude deviation 236.

In some embodiments, the ACPMS 200 executes a mode change based on the alert 280. For example, the ACPMS 200 can cause a mode change to deactivate the altitude capture controller 210 responsive to the alert 280.

In some embodiments, the ACPMS 200 causes the display device 294 to present an indication of the alert 280. The ACPMS 200 can cause an audio output device (not shown) to output an audio indication of the alert 280.

Figure 3:
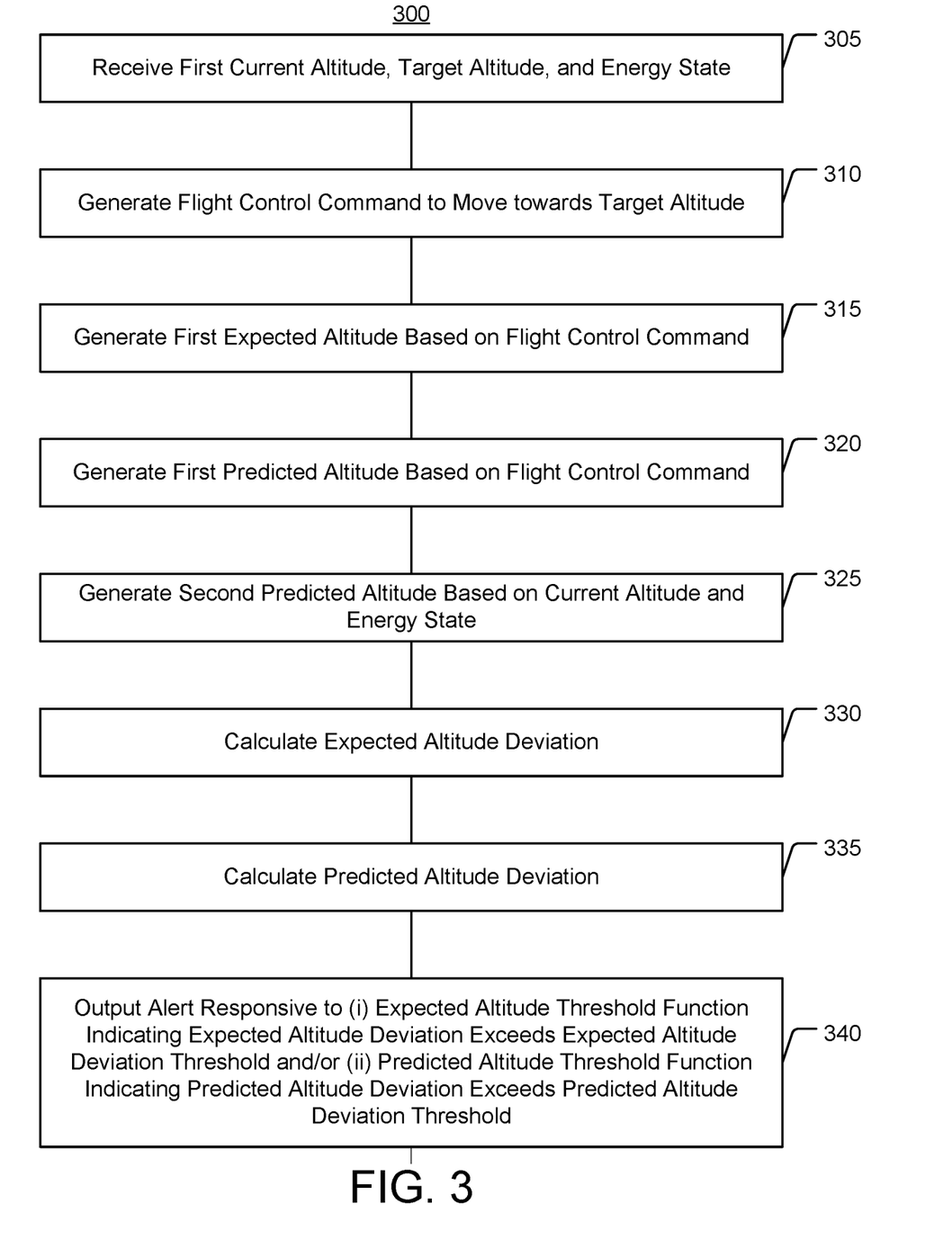
FIG. 3 is a flow diagram of a an exemplary embodiment of a method of executing altitude capture performance monitoring according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the control system 100 and the ACPMS 200, and/or components thereof.

A step (305) may include receiving, at an altitude capture controller, a first current altitude of a platform, a target altitude, and at least one energy state parameter regarding the platform. The at least one energy state parameter can include a vertical speed of the platform.

A step (310) may include generating, by the altitude capture controller, a flight control command expected to cause the platform to move to the target altitude based on the current altitude and the at least one energy state parameter. The flight control command can include a pitch command. In some embodiments, the altitude capture controller executes a proportional-integral-derivative (PID) controller, such as by using an error between a target altitude and current altitude of the platform as the proportional variable, and the vertical speed and acceleration of the platform as the derivative variables.

A step (315) may include generating, by the altitude capture controller, a first expected altitude of the platform for a first point in time based on the flight control command. The altitude capture controller can calculate the expected altitude for a first point in time, such as a first point in time in the future relative to a time at which the current altitude is measured (and relative to a time at which the calculation of the expected altitude occurs). In some embodiments, the expected altitude indicates an altitude that the platform is expected to reach at the first point in time upon executing the flight control command.

A step (320) may include generating, by the altitude capture controller, a first predicted altitude of the platform for a second point in time subsequent to the first point in time based on the flight control command. The altitude capture controller can calculate the predicted altitude for a second point in time subsequent to the first point in time. In some embodiments, the predicted altitude indicates an altitude that the platform is expected to reach at the second point in time upon continuing to execute flight control commands that are generated by the altitude capture controller in order to achieve the target altitude.

A step (325) may include generating, by an altitude profile predictor, a second predicted altitude of the platform for the second point in time based on the current altitude, the at least one energy state parameter, and an energy model representative of movement of the platform. The energy state can include an acceleration of the platform (and may also include a velocity of the platform, as is included in the energy state used by the altitude capture controller). By using the acceleration energy state, the altitude profile predictor can calculate the predicted altitude to more accurately determine an altitude that the platform is capable of achieving or will achieve given the current altitude. For example, the altitude profile predictor can execute an energy model using the acceleration energy state to determine relationships between factors such as the kinetic energy of the platform, the thrust generated by the platform (e.g., given the flight control commands) and associated lift of the platform, gravity, and drag, in order to determine the predicted altitude. The altitude profile predictor can determine the predicted altitude for the second point in time for which the predicted altitude is determined by the altitude capture controller.

A step (330) may include calculating, by an alert generator, an expected altitude deviation by comparing a second current altitude of the platform for the first point in time to the first expected altitude. The second current altitude may be received by sampling an altitude sensor at the first point in time. The expected altitude deviation may be calculated by subtracting one of the first expected altitude or the second current altitude from the other of the first expected altitude or the second current altitude.

A step (335) may include calculating, by the alert generator, a predicted altitude deviation by comparing the first predicted altitude to the second predicted altitude. The predicted altitude deviation may be calculated by subtracting one of the first predicted altitude or the second predicted altitude from the other of the first predicted altitude or the second predicted altitude.

A step (340) may include outputting, by the alert generator, an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold. The predicted altitude deviation threshold may be set to a level indicative of the platform failing to perform the altitude capture maneuver if the energy state of the platform is insufficient, particularly if the altitude at which the platform is predicted to be in the future as calculated by the altitude capture controller is significantly different than the altitude at which the platform is predicted to be in the future as calculated by the altitude profile predictor. The predicted altitude deviation threshold may be determined based on simulation and/or testing of the platform with various altitude capture maneuver attempts, energy states, and altitudes. The threshold may be set to a level indicative of the platform failing to perform the altitude capture maneuver if the energy state of the platform is insufficient, particularly if the actual altitude of the platform is significantly different than the expected altitude that was calculated by the altitude capture controller. The expected altitude deviation threshold may be determined based on simulation and/or testing of the platform with various altitude capture maneuver attempts, energy states, and altitudes. In some embodiments, the expected altitude threshold function applies a gain to the expected altitude deviation. In some embodiments, the predicted altitude threshold function applies a gain to the predicted altitude deviation. In some embodiments, the alert generator applies delay(s) to outputs of the comparisons, such as to more accurately align generation of the alert to physical action of the platform. In some embodiments, the method includes outputting at least one of a visual representation or an audio representation of the alert.

In some embodiments, the method 300 includes executing an automatic mode change based on the alert. Executing the automatic mode change can include at least one of deactivating the altitude capture controller or activating an autothrottle of the platform.

As will be appreciated from the above, systems and methods for altitude capture performance monitors according to embodiments of the inventive concepts disclosed herein may improve operation of aircraft and other platforms by activating alerts as to whether an altitude capture maneuver may fail or be performed improperly prior to undesirable behavior occurring, enabling an automatic corrective response and/or a flight crew to perform a corrective response.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A flight controller, comprising:
an altitude capture controller configured to:
receive a first current altitude of a platform, a target altitude, and at least one energy state parameter regarding the platform;
generate a flight control command expected to cause the platform to move to the target altitude based on the first current altitude and the at least one energy state parameter;
generate a first expected altitude of the platform for a first point in time based on the flight control command; and
generate a first predicted altitude of the platform for a second point in time subsequent to the first point in time based on the flight control command;
an altitude profile predictor configured to:
generate a second predicted altitude of the platform for the second point in time based on the first current altitude, the at least one energy state parameter, and an energy model representative of movement of the platform; and
an alert generator configured to:
calculate an expected altitude deviation by comparing a second current altitude of the platform for the first point in time to the first expected altitude;

calculate a predicted altitude deviation by comparing the first predicted altitude to the second predicted altitude; and output an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

2. The flight controller of claim 1, wherein the expected altitude threshold function applies a first gain to the expected altitude deviation, and the predicted altitude threshold function applies a second gain to the predicted altitude deviation.

3. The flight controller of claim 1, wherein an alert generator outputs the alert responsive to an airspeed evaluation function indicating an airspeed deviation between a target airspeed of the platform and an indicated airspeed of the platform exceeds an airspeed deviation threshold.

4. The flight controller of claim 1, wherein the expected altitude threshold function applies a delay to a comparison of the expected altitude deviation and the expected altitude deviation threshold.

5. The flight controller of claim 1, wherein the predicted altitude threshold function applies a delay to a comparison of the predicted altitude deviation and the predicted altitude deviation threshold.

6. The flight controller of claim 1, wherein the flight controller uses the alert to execute an automatic mode change.

7. The flight controller of claim 6, wherein the flight controller executes the automatic mode change by at least one of deactivating the altitude capture controller or activating an autothrottle of the platform.

8. The flight controller of claim 1, wherein the flight controller outputs at least one of a visual representation or an audio representation of the alert.

9. The flight controller of claim 1, wherein at least one of (i) the predicted altitude deviation threshold is set to a first value above which the platform cannot complete an altitude capture maneuver to achieve the target altitude or (ii) the expected altitude deviation threshold is set to a second value above which the platform cannot complete the altitude capture maneuver to achieve the target altitude.

10. The flight controller of claim 1, wherein the altitude capture controller generates the flight control command by executing a proportional-integral-derivative (PID) function using an error between the target altitude and the first current altitude as a proportional parameter of the PID function, and a vertical speed and vertical acceleration as derivative parameters of the PID function.

11. An airborne platform, comprising:
an autopilot that controls a flight control surface;
a flight controller, comprising:
an altitude capture controller configured to:
receive a first current altitude, a target altitude, and at least one energy state parameter;
generate a flight control command to move to the target altitude based on the first current altitude and the at least one energy state parameter;
transmit the flight control command to the autopilot to cause the autopilot to control the flight control surface based on the flight control command;
generate a first expected profile parameter for a first point in time based on the flight control command; and generate a first predicted profile parameter for a second point in time subsequent to the first point in time based on the flight control command;
an altitude profile predictor configured to:
generate a second predicted profile parameter of the platform for the second point in time based on the first current altitude, the at least one energy state parameter, and an energy model representative of movement of the platform; and
an alert generator configured to:
calculate an expected deviation by comparing a current profile parameter of the platform for the first point in time to the first expected profile parameter;
calculate a predicted deviation by comparing the first predicted profile parameter to the second predicted profile parameter; and
output an alert responsive to at least one of (i) an expected deviation threshold function indicating the expected deviation exceeds an expected deviation threshold or (ii) a predicted deviation function indicating the predicted deviation exceeds a predicted deviation threshold; and
a user interface configured to output an indication of the alert.

12. The airborne platform of claim 11, wherein the first expected profile parameter includes at least one of an altitude parameter or a vertical speed parameter.

13. The airborne platform of claim 11, wherein the first predicted profile parameter includes at least one of an altitude parameter or a vertical speed parameter.

14. The airborne platform of claim 11, wherein the alert generator outputs the alert responsive to an airspeed evaluation function indicating an airspeed deviation between a target airspeed of the platform and an indicated airspeed of the platform exceeds an airspeed deviation threshold.

15. The airborne platform of claim 11, wherein the autopilot includes an autothrottle, and the flight controller outputs the alert to cause the autopilot to engage the autothrottle.

16. The airborne platform of claim 11, wherein the user interface outputs at least one of a visual representation or an audio representation of the alert.

17. A method, comprising:
receiving, at an altitude capture controller, a first current altitude of a platform, a target altitude, and at least one energy state parameter regarding the platform;
generating, by the altitude capture controller, a flight control command expected to cause the platform to move towards the target altitude based on the first current altitude and the at least one energy state parameter;
generating, by the altitude capture controller, a first expected altitude of the platform for a first point in time based on the flight control command;
generating, by the altitude capture controller, a first predicted altitude of the platform for a second point in time subsequent to the first point in time based on the flight control command;
generating, by an altitude profile predictor, a second predicted altitude of the platform for the second point in time based on the first current altitude, the at least one energy state parameter, and an energy model representative of movement of the platform;

calculating, by an alert generator, an expected altitude deviation by comparing a second current altitude of the platform for the first point in time to the first expected altitude;

calculating, by the alert generator, a predicted altitude deviation by comparing the first predicted altitude to the second predicted altitude; and outputting, by the alert generator, an alert responsive to at least one of (i) an expected altitude threshold function indicating the expected altitude deviation exceeds an expected altitude deviation threshold or (ii) a predicted altitude threshold function indicating the predicted altitude deviation exceeds a predicted altitude deviation threshold.

18. The method of claim 17, comprising:

applying, by the expected altitude threshold function, a first gain to the expected altitude deviation; and applying, by the predicted altitude threshold function, a second gain to the predicted altitude deviation.

19. The method of claim 17, comprising outputting, by the alert generator, the alert responsive to an airspeed evaluation function indicating an airspeed deviation between a target airspeed of the platform and an indicated airspeed of the platform exceeds an airspeed deviation threshold.

20. The method of claim 17, comprising outputting, by the alert generator, at least one of a visual representation or an audio representation of the alert.

\* \* \* \* \*